United States Patent [19]

Whittington et al.

[11] Patent Number: 4,837,511
[45] Date of Patent: Jun. 6, 1989

[54] METHOD AND APPARATUS FOR IDENTIFYING THE METAL INCLUDED IN A METALLIC ITEM

[75] Inventors: Herbert W. Whittington, Longniddry; James R. Jordan, Dunfermline; Ian Flanagan, Edinburgh, all of United Kingdom

[73] Assignee: Ranco Europe Limited, Devon, England

[21] Appl. No.: 2,655

[22] PCT Filed: Apr. 25, 1986

[86] PCT No.: PCT/GB86/00226
§ 371 Date: Dec. 16, 1986
§ 102(e) Date: Dec. 16, 1986

[87] PCT Pub. No.: WO86/06364
PCT Pub. Date: Nov. 6, 1986

[30] Foreign Application Priority Data

Apr. 26, 1985 [GB] United Kingdom ............... 8510732

[51] Int. Cl.[4] ............... G01N 27/74; G01R 33/12; G01V 3/08
[52] U.S. Cl. ............... 324/236; 324/327; 324/204
[58] Field of Search ............... 324/209, 227, 236, 239, 324/238, 226, 262, 326, 327, 328, 329, 240; 73/861.05, 861.11, 64; 340/16, 31

[56] References Cited

U.S. PATENT DOCUMENTS

| 3,528,004 | 9/1970 | Katabami . | |
|---|---|---|---|
| 3,699,429 | 10/1972 | Ratz . | |
| 3,956,692 | 5/1976 | Weinberg . | |
| 4,004,216 | 1/1977 | Natens et al. . | |
| 4,038,609 | 7/1977 | Langberg | 324/236 X |
| 4,219,805 | 8/1980 | Magee et al. | 324/204 X |
| 4,523,146 | 6/1985 | Champaiene | 324/236 X |
| 4,536,713 | 8/1985 | Davis et al. | 324/204 X |
| 4,568,937 | 2/1986 | Clark | 324/236 X |
| 4,651,091 | 3/1987 | Chambers et al. | 324/227 X |
| 4,651,092 | 3/1987 | Brunsch et al. | 324/204 |

FOREIGN PATENT DOCUMENTS

| 2214898 | 8/1974 | France . | |
|---|---|---|---|
| 1348881 | 3/1974 | United Kingdom . | |
| 2004374 | 3/1979 | United Kingdom | 324/204 |

OTHER PUBLICATIONS

Buss L. and Bogart L. "Wide Range Marginal Oscillator for Operating Nuclear Resonance Probes Through Flexible Cable", pp. 204–205, Nov. 1959.
Robinson F. N. H. "Nuclear Resonance Absorption Circuit", pp. 481–487, Journal of Scientific Instruments, vol. 36, Dec. 1959.
Probst P. A., Collet B. and Macinnes W. M. "Marginal Oscillator Optimised for Radio-Frequency Size Effect Measurements", pp. 1522–1526, Rev. Sci. Instrum., vol. 47, No. 12, Dec. 1976.

*Primary Examiner*—Reinhard J. Eisenzopf
*Assistant Examiner*—Warren S. Edmonds
*Attorney, Agent, or Firm*—Nixon & Vanderhye

[57] ABSTRACT

The detection and identification of metal items is effected by a marginal oscillator the resonant circuit of which has an inductor surrounding a path along which any metal items are caused to travel. The frequency and amplitude changes in the oscillation produced by the oscillator due to the presence of a metal item in the inductor are compared with the changes caused by items of known metals and the identity of the metal of the item is derived from the comparison. Continuous or periodic drift correction of the frequency and amplitude values may be effected using a reference coil. Among other examples the invention may be used to monitor metallic particles in a lubricant or to identify larger items such as coins.

23 Claims, 11 Drawing Sheets

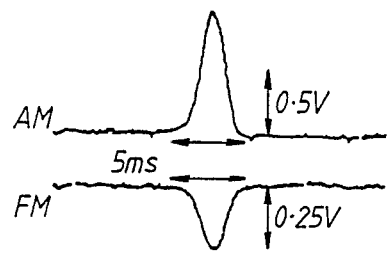
FIG. 5(a) ALUMINIUM 36
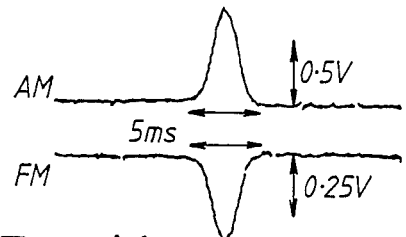
FIG. 5(b) COPPER 35
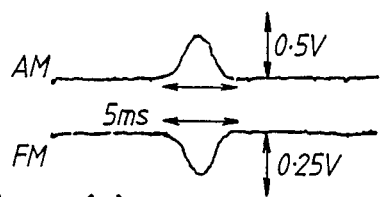
FIG. 5(c) COPPER 4
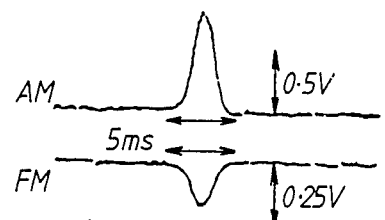
FIG. 5(d) BRASS 3
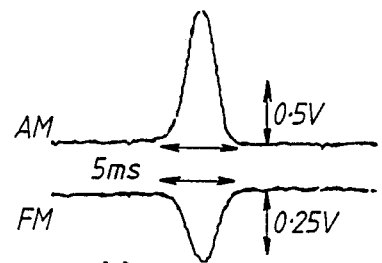
FIG. 5(e) BRASS 37
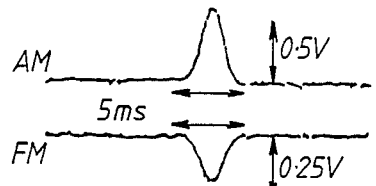
FIG. 5(f) ALUMINIUM 31
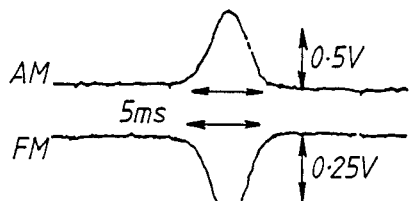
FIG. 5(g) COPPER 34

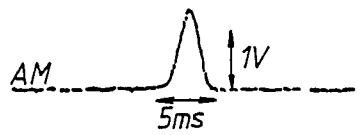
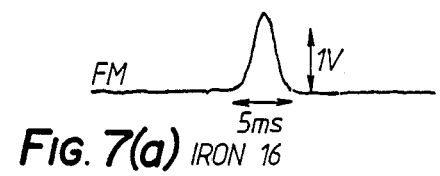
FIG. 7(a) IRON 16
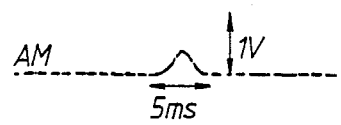
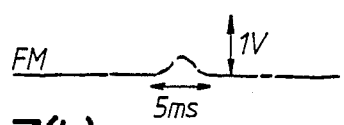
FIG. 7(b) STEEL 28
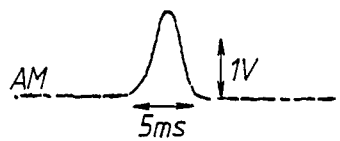
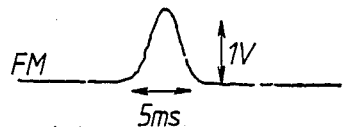
FIG. 7(c) IRON 23
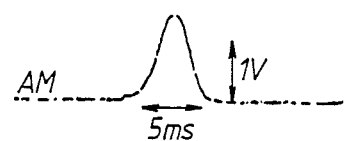
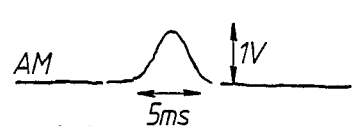
FIG. 7(d) STEEL 2
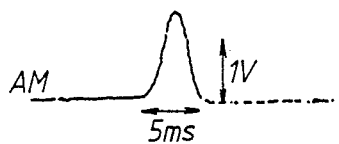
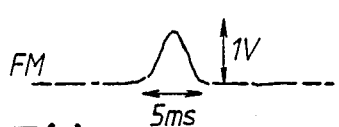
FIG. 7(e) STEEL 19
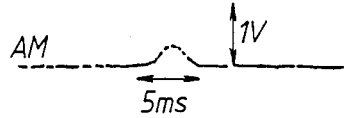
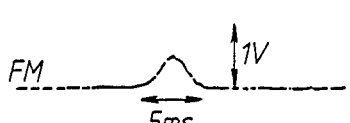
FIG. 7(f) IRON 18

METHOD AND APPARATUS FOR IDENTIFYING THE METAL INCLUDED IN A METALLIC ITEM

BACKGROUND OF THE INVENTION

This invention relates to a method and an apparatus for detecting metals and is especially but not exclusively suited to monitoring metallic debris in fluids generally and in lubricating oil in particular. In other examples the invention can be made to respond to larger metallic items such as coins.

In many engineering applications, moving parts in contact with each other must be lubricated. Despite the efficiency of the lubrication method employed, over a period of time, wear inevitably occurs. The result is that small particles of the material from which the parts concerned are made are released and carried away in the moving oil. It follows that measurement of the levels and type of particulate contamination in a lubricating oil can be used as an indicator of the mechanical condition of the equipment.

While it is a relatively simple task to perform off-line analysis of oil samples, continuous monitoring of an oil in situ presents a more difficult problem, requiring appropriate transducer systems measuring an appropriate property which changes with the build up of contamination of the oil.

One form of apparatus which has been proposed for the continuous monitoring of particulate contamination of lubricating oil is described in British Patent Specification No. 1 348 881 and uses a bridge circuit to sense the differential changes in impedance of two coils magnetically coupled to the flowing oil due to particles carried along by the oil. British Patent Specification No. 1 510 103 and British Patent Application No. 2 004 374A utilize the change in resonant frequency of a tuned circuit due to the passage of a metallic particle through the inductor of the circuit to provide an indication of the presence of the particle.

It is also known from British Patent Specification No. 1 510 103 that ferromagnetic, electrically conductive and electrically resistive particles produce different effects on the inductance of a coil when they are magnetically coupled to it.

SUMMARY OF THE INVENTION

It is an object of the present invention to provide a method and apparatus for detecting metal items and producing an indication of the metal of which the item is composed.

According to one aspect of the present invention there is provided a method of detecting metal items moving along a predetermined path, providing an oscillator having a resonant circuit including a capacitor and an inductor, the oscillator being such that the frequency of its oscillation is dependent on the inductance of the inductor and the amplitude of the oscillation is dependent on the resistive loading on the inductor, magnetically coupling the inductor to the predetermined path so that any metal item moving along it would be coupled to the inductor, measuring the changes in the frequency and the amplitude of the oscillation due to the passage of the item along the path, and providing an output indication characteristic of the metal of the item moving along the predetermined path.

According to a second aspect of the present invention there is provided apparatus for detecting metal items moving along a predetermined path including an oscillator having a resonant circuit including a capacitor and an inductor, the oscillator being such that the frequency of its oscillation is dependent on the inductance of the inductor and the amplitude of its oscillation is dependent on the resistive loading on the inductor, and the inductor being magnetically coupled to the predetermined path, first means for measuring changes in the frequency of the oscillation produced by the oscillator, second means for measuring changes in the amplitude of the oscillation produced by the oscillator, and output means responsive to the first means and second means to produce an output indication characteristic of the metal of the item moving along the predetermined path.

The metal items could be particles in a flow of fluid, such as lubricating oil, a coolant fluid, a slurry e.g. of wood pulp, or smoke. Alternatively, the metal items could be coins in a coin feed mechanism for operation of coins of several denominations possibly from different countries, or credit or identification cards having areas of different metals.

In order to provide the magnetic coupling between the predetermined path and the inductor, the path could be routed through the inductor.

The oscillator may be of a kind known as marginal oscillator developed for nuclear magnetic resonance spectrometers, magnetometers and magnetic field stabilisers. One such oscillator uses a high impedance or current drive to a parallel resonant circuit so that the amplitude of the oscillation produced is strongly dependent on the resistive loading on the inducoor of the resonant circuit.

Considering an oscillator having a parallel resonant circuit consisting of an inductor and a capacitor connected in parallel, the effects of items of different metals becoming magnetically coupled to the inductor can be summarised as follows:

If the item is ferromagnetic the inductance of the inductor is increased due to the increased permeability of its magnetic circuit. The oscillator therefore produces an oscillation of lower frequency due to the reduction of the resonant frequency of the circuit. The electrical resistance of the item will also load the inductor and reduce the amplitude of the oscillation produced.

If the item is non-magnetic, electrically conductive and of low resistance, eddy currents of relatively large amplitude will be set up in the item by the magnetic field of the inductor which will have the effect of reducing the inductance of the inductor. The frequency of the oscillation produced by the oscillator will therefore rise by an amount depending on the size of the item. As electrical conductors are normally resistive to some extent there will also be reduction in the amplitude of the oscillation due to the loading on the inductor.

Finally, if the item is non-magnetic, electrically conductive but resistive, there will again be a rise in the frequency of the oscillation due to the reduction in the inductance, and there will also be some loading on the inductor due to the energy absorption from the eddy currents through the resistance of the item. The amplitude of the oscillation produced by the oscillator will therefore fall as a result of this loading. The frequency rise will be smaller than in the case of a good conductor because the eddy currents are reduced by the resistance.

The invention makes use of these changes in the oscillation due to the effects of the different properties of different metals to provide an indication of the metal of which the item is composed. Since the magnitudes of the effects are dependent on the size of the items an output indication of that size can also be produced.

The frequency and amplitude of the oscillation produced by the oscillator may be measured by suitable demodulation circuits which produce corresponding output voltages or other forms of representation of the values. If the frequency and amplitude values for items of different metals are plotted as points on a two-dimensional graph it is found that the points for items of the same metal lie in compact areas shaped like sectors extending approximately radially from the origin, and that for items of larger size the points are more distant from the origin than points for items of smaller size.

One possible way of using the frequency and amplitude values to provide an indication of the metal detected would be to use the values to deflect a cathode ray tube beam so that the resulting spot of light falls in one of a number of areas of the screen respectively corresponding to the different metals likely to occur. The screen could be provided with an overlay on which the various areas have been marked, for example after calibration experiments. Other forms of two-dimensional display such as a plotter could be used instead of a cathode ray tube.

Another way to use the frequency and amplitude value is to convert them to digital form and process them by digital computing means programmed to produce a display indicating the likely metal detected. Where the values could be indicative of more than one metal the computing means may be programmed to indicate the respective probabilities associated with different likely metal identifications, possibly taking into consideration previous items detected. The use of digital computing means would also permit other characteristics of the values to be determined such as:

(1) maximum pulse height
(2) the number of pulses in a given amplitude range
(3) the width (i.e. time duration) of pulse detected
(4) the area under pulse curves
(5) the polarity of the pulses detected
(6) the levels of fine particulate contamination in fluid
(7) the average value of pulse amplitudes over a given period
(8) particle sizes and materials, etc.

It has been found that a basic oscillator frequency of about 10 MHz can give good results with the metal particle contamination in lubricating oil, and generally speaking the larger the item to be detected the lower the frequency that should be used and vice versa. Where a range of item sizes are likely to be encountered it may be useful to provide several oscillators operating at different frequencies. One system according to the invention has been found to be capable of identifying correctly iron, brass, aluminum and copper particles down to about 150 microns in size.

In an alternative arrangement the oscillator is switchable to different frequencies so that the frequency giving the best results can be selected, possibly under the control of the computer processing the amplitude and frequency values from the oscillator.

BRIEF DESCRIPTION OF THE DRAWINGS

In order that the invention may be fully understood and readily carried into effect an embodiment of it will now be described with reference to the accompanying drawings of which:

FIGS. 5A-5G are the outputs from the amplitude and frequency demodulators for non-ferrous metal samples;
FIGS. 7A-7F are the outputs from the amplitude and frequency demodulators for ferrous metal samples.

DESCRIPTION OF THE PREFERRED EMBODIMENT

The example of the invention to be described with reference to the accompanying drawings is apparatus for detecting metallic particles in the flow of a lubricant and has been shown to be capable of detecting particles of about 50 microns in diameter. In addition to detecting the particles the apparatus produces output indications of the metal of which the particle is composed and its size. It will be understood that this information is useful in monitoring the condition of a mechanism since the metal of the particles will indicate their source and the site of a possible breakdown and their size may indicate the nature of a failure.

Figure 1:
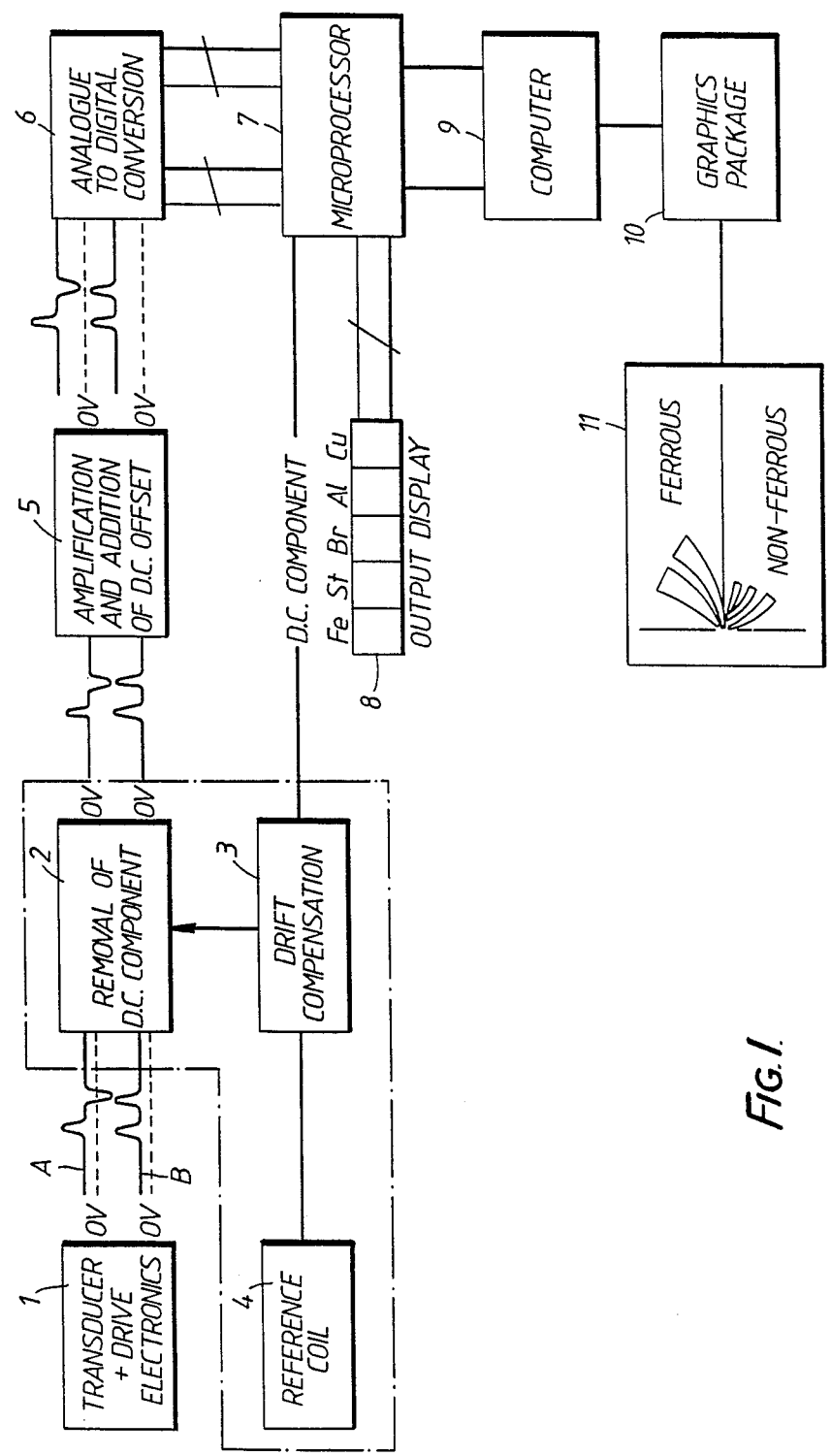
FIG. 1 is a block diagram of the apparatus.

Referring now to FIG. 1, the apparatus consists of a transducer and drive electronics unit 1 coupled to the flowing lubricant which provides two output analogue signals A and B respectively representing the frequency and amplitude changes of the oscillation produced by an oscillator having a tuned circuit inductor as the transducer included in the unit 1. The signals A and B are applied to a block 2 which serves to remove the DC components of the analogue signals A and B in response to the output from a drift compensation circuit 3 containing an oscillator of the same construction as that in the unit 1 and connected to a reference coil 4 similar to the inductor in the unit 1 but isolated from the metal particles in the lubricant. The signals A and B with the DC components removed are the response of the unit 1 to the metal particles and are applied to a circuit 5 which amplifies the signals and adds a predetermined DC offset to them so that they are always of the same polarity. These unipolar signals are converted to digital form by analogue to digital converters 6 and applied to a microprocessor 7 for processing. A representation of the DC component removed by the drift compensation circuit 3 which represents the contamination of the lubricant by sludge too fine to be detected as individual particles is also applied to the microprocessor 7. A display unit 8 driven by the microprocessor 7 has separate outputs indicating whether the detected particle is of iron, steel, brass, aluminum or copper. The display may in addition indicate the size of the particle. In addition to producing the output display, the microprocessor 7 stores the information obtained and it is transferred to a computer 9 for further analysis. The graphics package 10 associated with the computer 9 causes the generation of a graphical display 11 of the ferrous and non-ferrous metal particles detected by the apparatus. The display 11 is shown in more detail in FIGS. 6 and 8.

Although the microprocessor 7 in the example described produces outputs for five specific metals, it may be provided with an interchangeable ROM for enabling the output display to represent the quantities of other metals such as, for example, lead and nickel. It will be understood that the changes in frequency and amplitude of the oscillation produced by the oscillator in the unit 1 may be similar for different metals, but in any mechanical system being monitored by the apparatus it will be known what metals are likely to occur in the lubricant and what metals cannot occur in the lubricant because no part of the mechanism uses such metals. Therefore the ROM inserted into microprocessor 7 will be selected in accordance with the mechanism being monitored and the output display 8 modified accordingly. For certain applications it may not be necessary to provide the reference coil and drift correction as it may be possible to monitor the changes in frequency and amplitude due to a particle with sufficient accuracy without them. In addition the digital computing capability of the microprocessor 7 and the computer 9 with its graphics package 10 may be combined in a single unit, and the display devices 8 and 11 may be combined or distributed to suit the particular application.

Figure 2A:
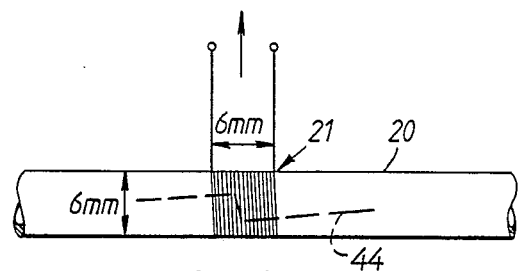
FIG. 2A shows the inductor used in the apparatus of FIG. 1.

The transducer and drive electronics unit 1 consists of an oscillator having a parallel resonant circuit formed by a capacitor and an inductor, which determines the frequency of the oscillation generated. The inductor which performs the function of the transducer is wound round a non-metallic pipe through which the lubricant is caused to flow. As shown in FIG. 2A, the pipe 20 is of 6 mm outside diameter and 3 mm inside diameter with the inductor 21 formed of 24 turns of enamelled copper wire of 34 SWG wound round outside of the pipe 20 and extending for a length of 6 mm. The turns of the inductor 21 are secured in position by a layer of epoxy resin applied on the outside. It is not necessary for the transducer coil to provide the whole of the inductive component of the resonant circuit.

Figure 2B:
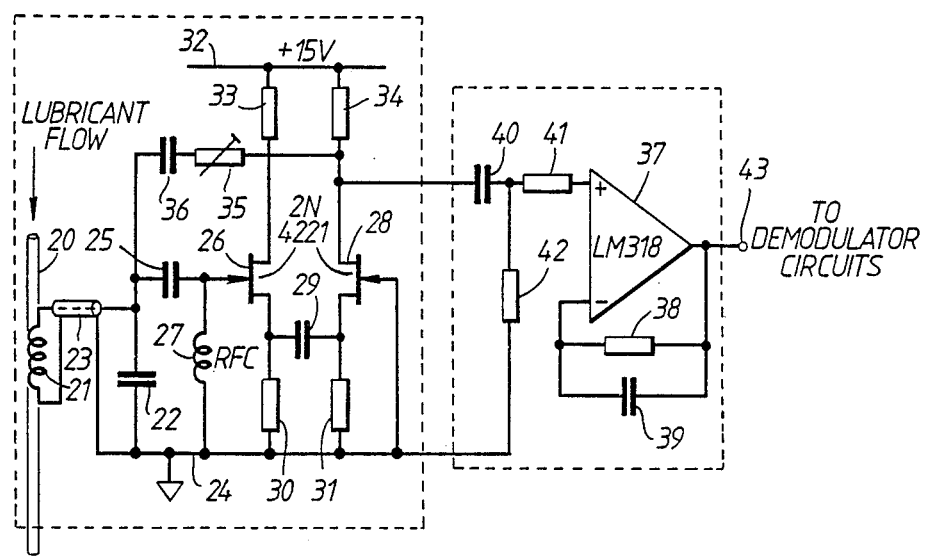
FIG. 2B is the circuit diagram of the oscillator included in the drive electronics of FIG. 1.

The circuit diagram of the oscillator itself is shown in FIG. 2B and is what is termed a marginal oscillator which is such that the oscillation produced by it changes in frequency as the self-inductance of the inductor 21 changes, and changes in amplitude as the resistive loading on the inductor 21 changes. In the oscillator, the inductor 21 is connected in parallel with a capacitor 22 by a length of coaxial cable 23 to form a parallel resonant circuit. One end of the inductor 21 and one electrode of the capacitor 22 are connected to an earthed conductor 24, and the other end is connected via a capacitor 25 to the gate of a FET 26, the gate being earthed through a choke 27. The source of the transistor 26 is connected to the source of a second FET 28 through a capacitor 29, and the sources of both transistors are earthed through resistors 30 and 31 respectively. The gate of transistor 28 is also earthed. A conductor 32 is maintained at a 15 volts positive and is connected through resistors 33 and 34 respectively to the drains of the transistors 26 and 28. The drain of the transistor 28 is connected through a preset resistor 35 and a capacitor 36 to the resonant circuit formed by the inductor 21 and capacitor 22. The components thus far described constitute the marginal oscillator with the values of the resistors 30 and 31 being selected and the resistor 35 adjusted so that the amplitude of the oscillation produced is responsive to the resistive loading on the inductor 21 by the metal particles in the lubricant flowing along the pipe 20. The base frequency of the oscillator is about 10 MHz. An oscillator of the same construction is included in the drift compensation circuit 3.

The output oscillation from the oscillator is applied to a buffer amplifier formed by an operational amplifier 37 having a negative feedback path containing a resistor 38 and a capacitor 39 in parallel. The non-inverting input of the amplifier 37 is connected through a capacitor 40 and a resistor 41 in series to the drain of the transistor 28. The junction of the capacitor 40 and resistor 41 is connected to earth through a resistor 42. The purpose of the buffer amplifier is to isolate the oscillator from the demodulation circuits connected to output terminals 43 so that the frequency and amplitude of the oscillation generated are not influenced by those circuits.

Figure 3A:
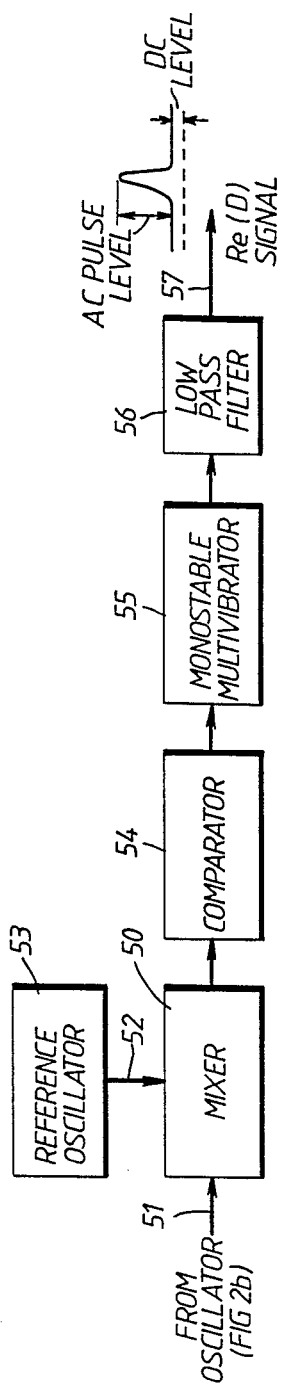
FIG. 3A is a block diagram of the frequency demodulator included in the drive electronics of FIG. 1.

The unit 1 also includes frequency and amplitude demodulators for producing outputs corresponding to the changes in frequency and changes in amplitude of the oscillation produced by the oscillator. FIG. 3A is the block diagram of the frequency demodulator which includes a mixer 50 which receives via conductor 51 the output from the oscillator and via a conductor 52 an oscillation of fixed frequency from a reference oscillator 53 arranged to oscillate to one side of the base frequency of the marginal oscillator so that its modified frequency can never be the same as the reference oscillator. The difference between the frequencies is fed from the mixer 50 via a comparator 54 to a multivibrator 55 which produces fixed duration pulses at the difference frequency. The output waveform of the multivibrator 55 is smoothed by a low pass filter 56 to produce on output conductor 57 a waveform similar to that shown in FIG. 3A which represents the change in frequency as a metal particle passes through the detector 21. For convenience, the output of the frequency demodulator is termed the Re(d) signal.

Figure 3B:
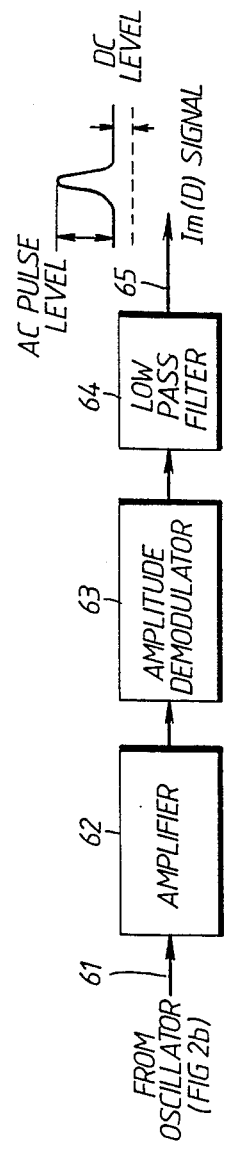
FIG. 3B is a block diagram of the amplitude demodulator included in the drive electronics of FIG. 1.

The amplitude demodulator is shown in FIG. 3B and receives the output from the marginal oscillator via a conductor 61 which after amplification in amplifier 62 is applied to the amplitude demodulator 63 itself. The output of the amplitude demodulator is smoothed by a low pass filter 64 and appears on a conductor 65 as a waveform of the form shown in FIG. 3B. For convenience, this signal is known s the imaginary or Im(d) signal.

The real and imaginary signals produced respectively by the frequency and amplitude demodulators are shown as waveforms A and B in FIG. 1. As these waveforms are subject to drifting, for example in response an accumulation of sludge in the lubricant, their DC components are removed by the unit 2 in response to the corresponding outputs of the drift compensation circuit 3, which as mentioned above includes the same kind of oscillator but not coupled to react to the metallic particles in the lubricant, and frequency and amplitude demodulators. The waveforms after removal of the DC components are amplified and combined with a predetermined DC offset by the circuit 5 so that the waveforms are always of the same polarity and therefore more easily converted to digital form by converters 6.

Figure 4:
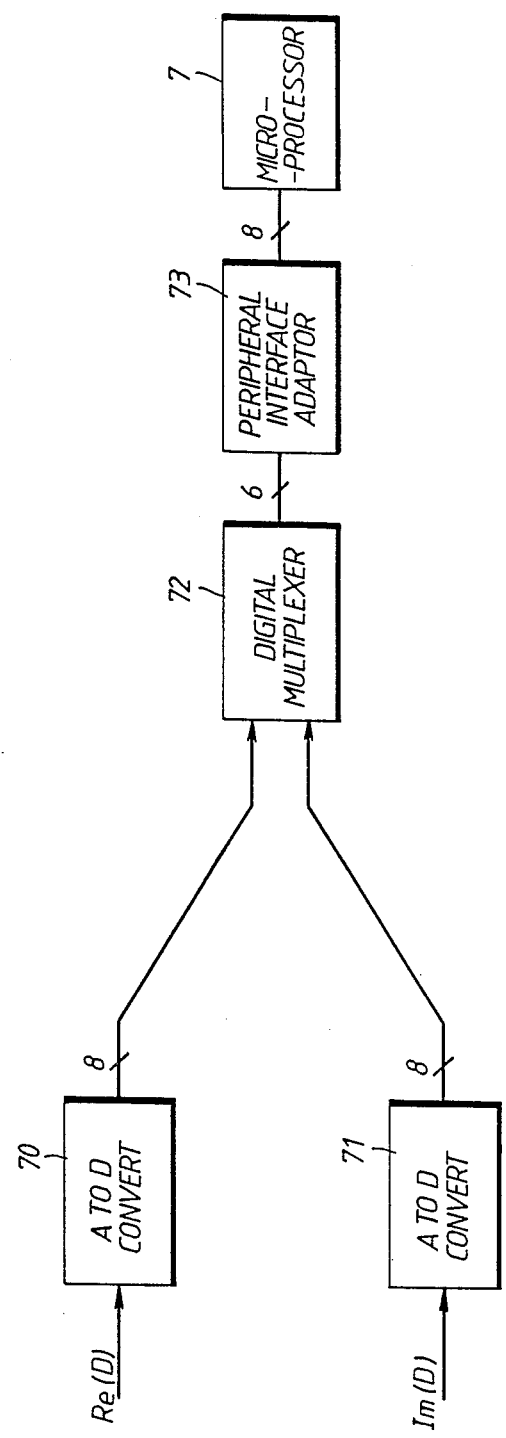
FIG. 4 is a block diagram of the analogue to digital converters shown in FIG. 1.

FIG. 4 is a block diagram showing the analogue to digital converters 70 and 71 which respectively receive the Re(d) and Im(d) signals and produce 8-bit parallel outputs which are multiplexed by multiplexer 72 and sequentially applied through a peripheral interface adapter 73 to the microprocessor 7. The construction of microprocessor 7 unit will not be described in detail, since it may be of conventional form with a microprocessor integrated circuit connected by data and address buses to RAM, ROM and interface chips. In one particular example an MC 6809 microprocessor integrated circuit was used.

Figure 6:
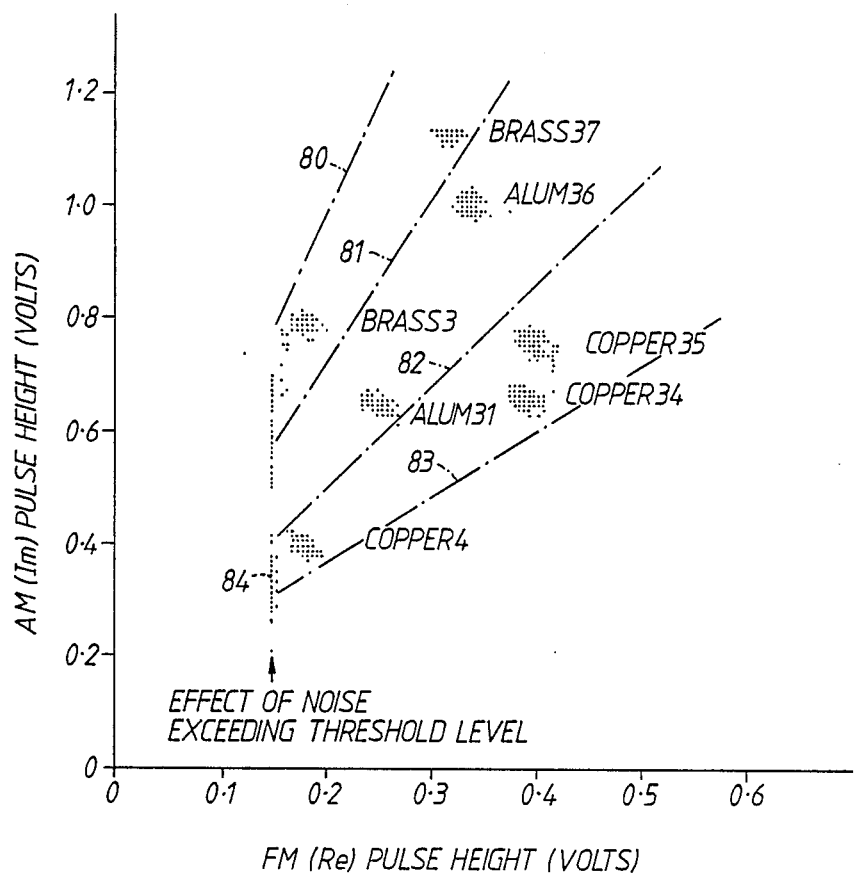
FIG. 6 is a graph showing the points representing the samples shown in FIGS. 5A-5G plotted on a graph of AM pulse height against FM pulse height.
Figure 8:
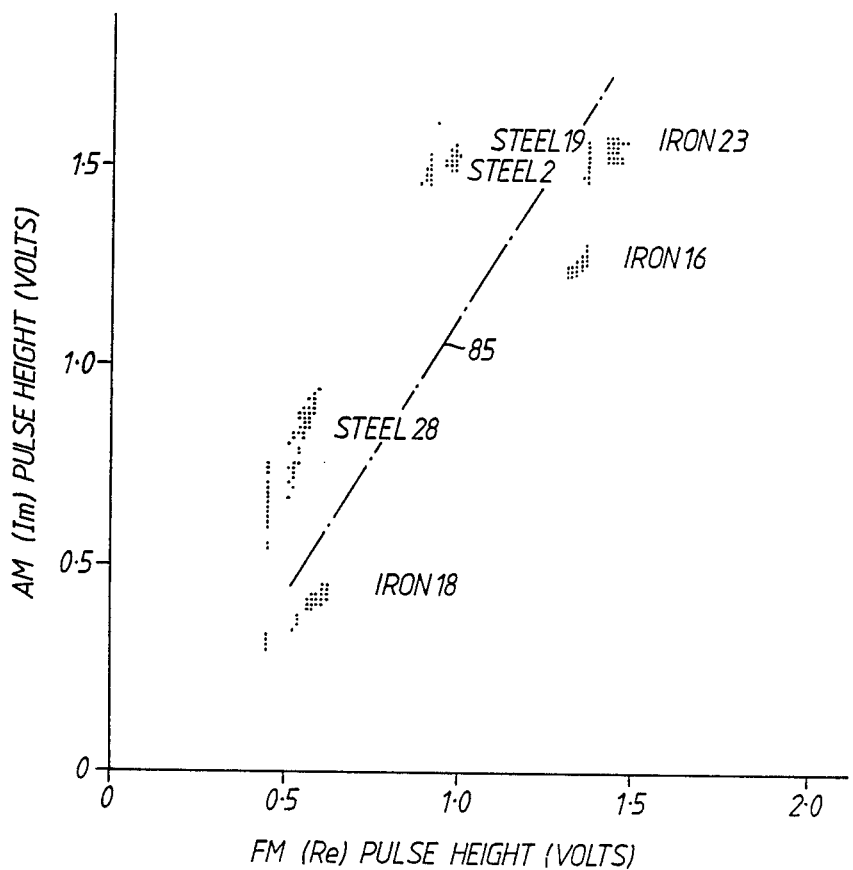
FIG. 8 is a graph showing the points representing the samples shown in FIGS. 7A-7F plotted on a graph of AM pulse height against FM pulse height.

Before describing the operations performed by the microprocessor 7, it will be helpful to consider the form of the waveforms Re(d) and Im(d) obtained respectively from the frequency and amplitude demodulators. FIGS. 5A-5G show the waveforms obtained from the two demodulators for different particles of different non-ferrous metals. In all cases owing to the electrical resistance of the metal there is a reduction in the amplitude of the oscillation which is represented by the positive-going pulse in the AM waveform. In addition, the fact that the metals are electrically conductive produces an increase in the frequency of the oscillation which is represented by the negative-going pulses in the FM waveforms. The metals of the particular particles are brass, copper and aluminum and the numbers following the names of the metals indicate the particular particle concerned. The microprocessor 7 is programmed to select the peak amplitudes of the pulses and to apply them for display on a graph of AM pulse height against FM pulse height as shown in FIG. 6. As the particle passes through the inductor 21 in different orientations its effect on the frequency and amplitude of the oscillation varies slightly, but as can be seen from FIG. 6 the points produced on the graph by each particle tend to cluster together and there can be seen seven distinct clusters which correspond respectively to the seven different particles the detection waveform of which is shown in FIGS. 5A-5G. The chain dotted lines 80, 81, 82 and 83 marked in FIG. 6 serve to divide the area of the graph into three distinct regions where the points corresponding to particles of the different metals might be expected to fall. Thus, brass particles would fall between lines 80 and 81, aluminum particles between lines 81 and 82 and copper particles between lines 82 and 83. The dotted line 84 indicates a threshold value for changes in frequency below which the frequency changes are ignored since they are likely to be due to noise in the circuits. As can be seen from FIG. 6, the regions are generally in the form of sectors extending radially from the origin and the points for particles of any particular metal become further away from the origin as the sizes of the particle increases. If it is required to detect different non-ferrous metals from brass, aluminum and copper, then the apparatus can be calibrated for such metals and the shape of the corresponding region on the graph of FIG. 6 determined by calibration. It is possible that there will be regions of uncertainty where the electrical conductivity and resistances are similar for two different metals. It would be possible for microprocessor to be programmed to indicate the probability that the particle is of one metal rather than the other.

Where particles of ferrous metals are involved, the increase in magnetic permeability due to the metal particle causes an increase in the inductance of the inductor 21 and consequently a reduction in the frequency of the oscillation. As ferrous metals are electrically resistive they also increase the loading on the inductor 21 and cause a corresponding reduction in the amplitude of the oscillation. The AM and FM waveforms for six ferrous particles are shown in FIGS. 7A-7F, and the distribution of the points on the graph of AM pulse height plotted against FM pulse height are shown in FIG. 8. The chain dotted line 85 separates the area of the graph into two regions respectively occupied by iron and steel particles. Again the regions are in the form of sectors.

Figure 9:
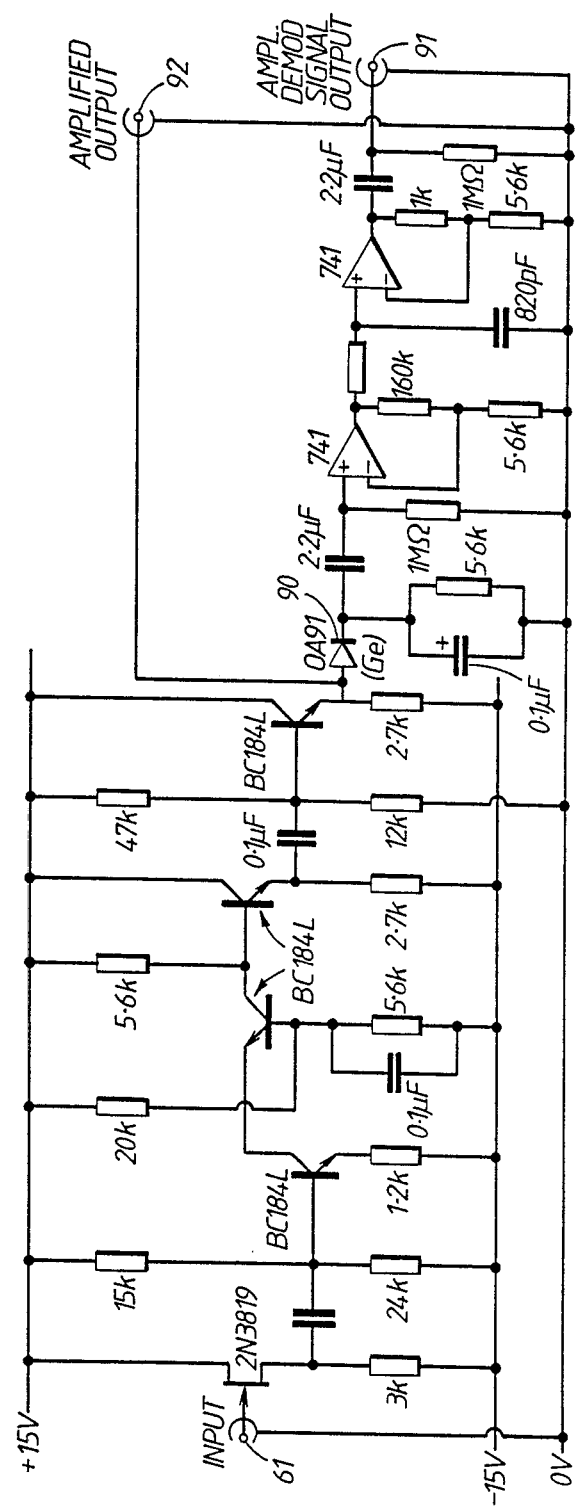
FIG. 9 shows the circuit diagram of an amplifier and the amplitude demodulator shown in FIG. 3B.

FIG. 9 shows the circuit diagram of the amplitude demodulator with the input 61 connected through a multi-stage transistor amplifier to a germanium diode detector 90 which acts as the amplitude demodulator. A buffer amplifier is provided consisting of two operational amplifiers to amplify the demodulated signal which appears at terminal 91. The amplifier of FIG. 9 is also used to supply an amplified signal via terminal 92 to the frequency demodulator the circuit of which is shown in FIGS. 10 and 11.

Figure 10:
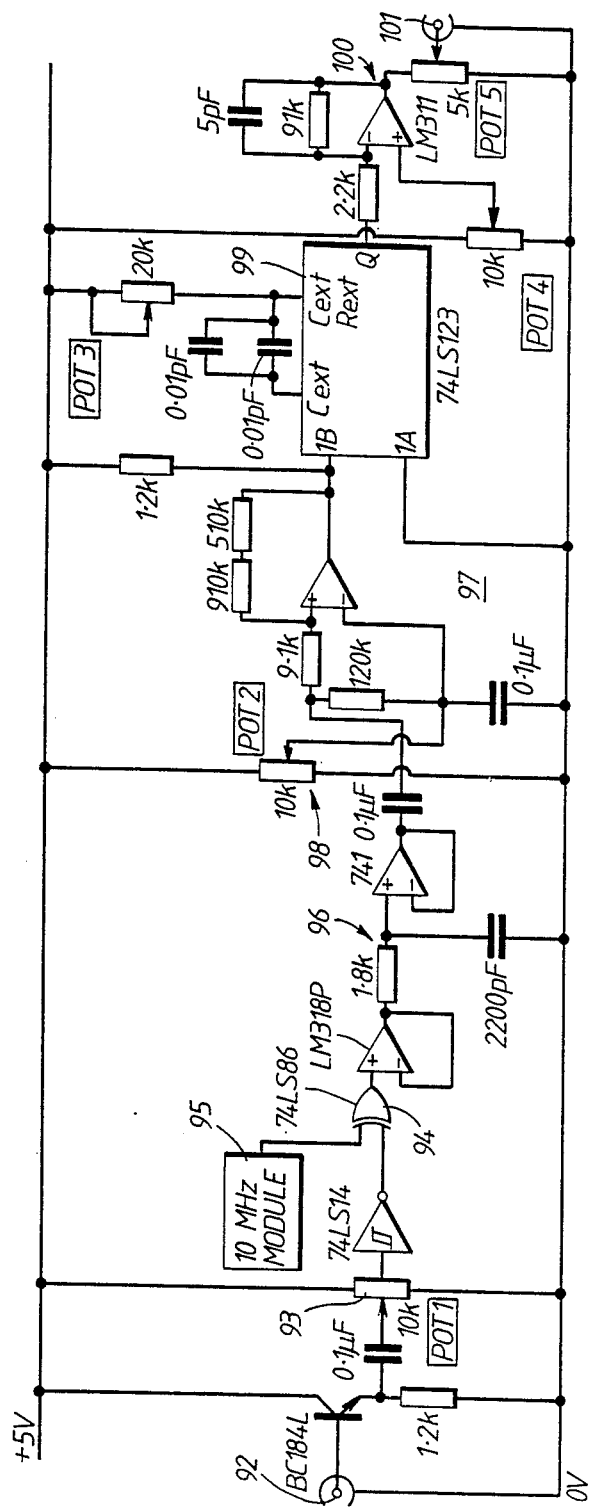
FIGS. 10 and 11 together show the circuit diagram of the frequency demodulator shown in FIG. 3A.

FIG. 10 is the circuit diagram of the blocks 50, 53, 54 and 55 of FIG. 3A and constitute the frequency demodulator. The amplified oscillation at terminal 92 is obtained from the amplifier shown in FIG. 9 and after adjustment of its level by the centre-tapped potentiometer 93, it is applied as an input to an exclusive OR-gate 94 which receives as its other input a 10 MHz oscillation from the oscillator 95. The output of the gate 94 is smoothed by an integrator circuit 96 having a time constant of about 4 microseconds. The output of the integrator 96 is applied to an input of an amplifying comparator circuit 97 which has a threshold voltage set by a potentiometer 98. The output of comparator 97 is applied to a monostable multivibrator 99 which produces output pulses of constant duration which are integrated by an integrator 100 to a steady voltage which appears at terminal 101.

In the operation of the circuit shown in FIG. 10, the exclusive OR-gate 94 acts as a mixer to combine the input oscillation with the 10 MHz signal produced by the oscillator 95. The frequency of the oscillator 95 is chosen to be to one side of the likely frequencies coming in via terminal 92 so that the output of the gate 94 consists of pulses whose duration varies sinusoidally at the frequency difference between the two oscillations applied to it. These pulses are smoothed by the integrator 96 to a sinusoidally varying voltage the zero crossings of which are detected by the comparator 97 and used to trigger the monostable multivibrator 99. Thus the output of the multivibrator 99 is a series of pulses of the same duration at the difference frequency between the two oscillations applied to the gate 94. The integrator 100 smooths the output pulses from the multivibrator 99 to a voltage proportional to the frequency difference so that there appears at the terminal 101 a voltage waveform similar to the FM waveforms shown in FIGS. 5 and 7.

Figure 11:
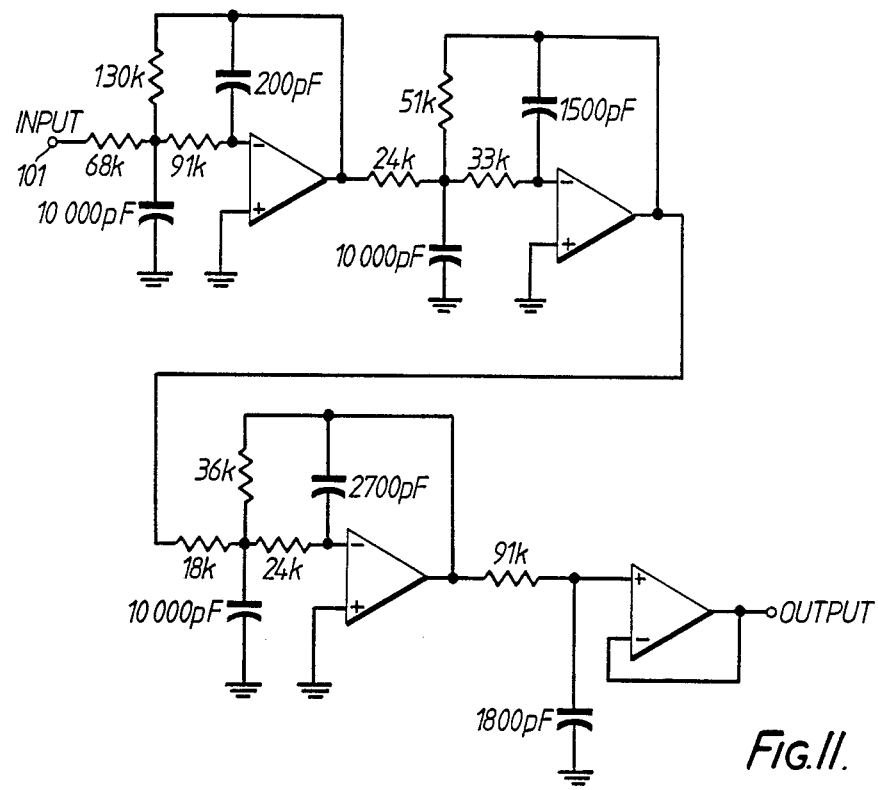

The output waveform at terminal 101 is smoothed further by the sixth order Butterworth low pass active filter shown in FIG. 11. This filter will not be described in detail since it is of conventional design having a cut off frequency of 1 kHz.

Figure 12A:
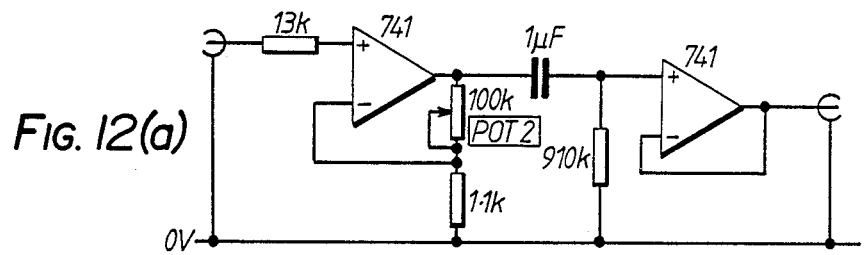
FIGS. 12A and 12B show the scaling circuits for the outputs of the amplitude, and frequency demodulators.
Figure 12B:
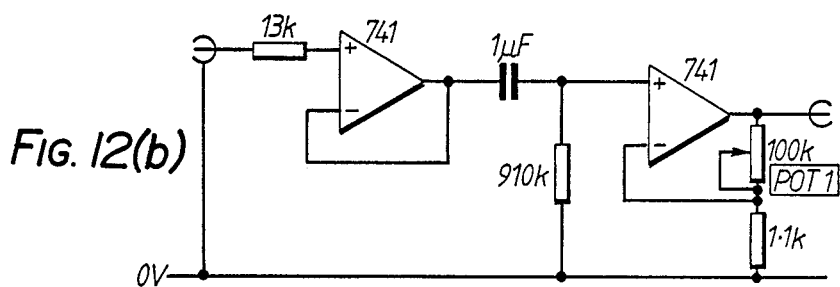

The amplitude and frequency demodulated signals are then scaled by the circuits shown respectively in FIGS. 12A and 12B and applied to the analogue to digital converters 70,71 of FIG. 4. If there is a wide range of particle sizes leading to a wide variation in the sizes of the pulses a logarithmic amplifier could be used in place of the scaling circuits to compress the range of variation of the demodulated signals.

As a particle passes through the inductor 21 the frequency and amplitude changes which it produces climb to a maximum and then decline again. Although it would be possible for the peak values of the analogue signals to be selected and applied to the analogue to digital converters using conventional peak sampling circuits, it is more convenient to arrange for the microprocessor to select the peak values in their digital form after conversion by analogue to digital converters. If the selection of the peak values of the digital signals makes too much demand on the digital computing capability of the microprocessor 7 and the computer 9 bearing in mind the other computing functions to be performed, separate digital peak value selection circuits may be provided. These peak values are used in several ways by the microprocessor 7 in conjunction with the computer 9. Firstly, the peak value of the frequency change signal is used to select boundary values between the amplitude change ranges corresponding to different metals and the input amplitude change value is compared with the boundary value to provide an indication of the metal detected. The microprocessor 7 then operates the display 8 to indicate the particular metal. Since the values of the frequency and amplitude changes depend on the size of the particle detected, these values can be compared with a scale in the microprocessor 7 to indicate the size of the particle detected. The total number of the particles of each metal and/or their total mass can be accumulated by the microprocessor 7 or the computer 9 to produce an indication of these amounts and possibly also to provide an alarm indication if the amount exceeds a predetermined threshold value. Alarm indications could also be produced in response to the detection of very large particles or a high rate of particle flow. The threshold levels for alarm indications to be produced may be different for different metals.

As mentioned above, the computer 9 by means of the graphics package 10 produces a display 11 of the ferrous and non-ferrous particles detected. This display may include brightness or colour indications of the number or mass of particles of a particular material detected in given size ranges so that a rapid visual assessment of the mechanical health of the mechanism can be made.

The microprocessor 7 and computer 9 may be arranged to monitor and interpret many characteristics of the values input to them and the following is a list of examples of such characteristics:

(1) maximum pulse height
(2) number of pulses in a given amplitude range
(3) the width i.e. time duration of the pulses detected
(4) the areas under the pulse curves
(5) the polarities of the pulses detected
(6) the levels of fine particulate contamination in the fluid
(7) the average value of the pulse amplitudes over a given period
(8) the number of particles and their materials and sizes
(9) an analysis of the tends in the numbers, sizes and materials of the particles over the life of the machine being monitored (the data would need to be stored in non-volatile memory)

On the basis of the received pulses the microprocessor and computer may be programmed to make adaptive changes to the threshold levels set to distinguish between one metal and another, to allow, for example, for the progressive accumulation of fine carbon particles in the oil the conductivity of which would provide progressively increased loading of the inductor and consequent reduction in the output amplitude of the oscillator. Progressive changes in the amplitudes of the pulses over a period of time could also be used to provide adaptive correction which could replace the drift compensation described above. The time duration of the pulses would indicate the rate of flow of the oil along the pipe and could enable a blockage of an oil filter to be detected.

The microprocessor may include a detachable ROM storing data relating to different groups of metals to enable the microprocessor to distinguish between the metals of a selected group by the changes they produce in the amplitude and frequency of the oscillation. Thus a particular readonly memory could be selected and plugged into or switched into the microprocessor to suit the metals likely to occur in any particular application of the apparatus. Similarly, the display 11 could be provided with detachable overlays having areas characteristic of particular metals marked on them so that the nature of the particles detected can be readily assessed. Since the size of the particle influences the magnitude of the frequency and amplitude changes which it produces in the oscillation, the overlays could include lines indicating particle size ranges.

Another application of the invention is in the identification of coins in a coin-feed mechanism responsive to a range of denominations of coinage and possibly also to coinage of different nationalities. In such apparatus a coin received would be routed to pass through the inductor sc that the oscillator would provide the frequency and amplitude changes referred to above. For such an application the basic frequency of the oscillation could be about 100 kHz since a lower frequency is more suited to the larger mass of metal included in the coin. In order to simplify the detection of the maximum amplitude and frequency changes the path of the coin may be arranged so that it is brought temporarily to a halt when in the inductor, for example by making the path of Z shape indicated by the dotted line 44 shown in FIG. 2a to schematically represent an alternate path for the centerline of conduit 20 through coil 21. The coin could be arranged to actuate a micro-switch at this time to operate value sensing circuits for the frequency and amplitude changes. A similar arrangement could be used to verify credit and identity cards having areas of different metals applied to them.

Among the modifications possible to the apparatus described above may be mentioned the replacement of the continuous drift correction using a separate oscillator by intermittent drift correction by connecting the reference coil briefly to the marginal oscillator in place of the transducer coil and noting the amplitude and frequency at this time. These values could be recorded by the microprocessor 7 and subtracted from the values obtained when sensing particles. Of course, during the brief periods when the transducer coil is not in use some particles may pass through it but if the periods are only a small proportion of the total time they are not likely to be statistically significant. The drift correction could alternatively be performed by the digital computing means on the basis of the values it receives.

Although passing the particles (or other items) through the inductor is a simple and effective way of magnetically coupling them to it, there may be applications, such as coin identification, where a different arrangement of the path of the item and the layout of the inductor gives better results.

What is claimed is:

1. A method of identifying the metal of which metal items moving along a predetermined path are made, providing an oscillator having resonant circuit including a capacitor and an inductor, the oscillator being such that the frequency of its oscillation is dependent on the inductance of the inductor and the amplitude of the oscillation is dependent on the resistive loading on the inductor, magnetically coupling the inductor to the predetermined path so that any metal item moving along it would be coupled to the inductor, separately measuring both the change in the frequency and the change in the amplitude of the oscillation due to the passage of the item along the path, and deriving from the changes in frequency and the changes in amplitude as measured an output indication characteristic of the metal of which the item moving along the predetermined path is composed.

2. A method according to claim 1, including the routing the predetermined path through the inductor so that any metal item moving along the predetermined path passes inside the inductor and the change in frequency and the change in amplitude of the oscillation due to the presence of the metal item exhibit peaks as its coupling to the magnetic circuit of the inductor reaches a maximum, and the output indication is responsive to the peak values of the change in frequency and of the changes in amplitude.

3. A method according to claim 2 including producing digital representations of the peak values of the change in frequency and of the change in amplitude of the oscillation and applying the representations to digital computing means programmed to generate an output indication identifying the metal in response to the representations.

4. A method according to claim 3 wherein the output indication includes the name of the metal identified in the item.

5. A method according to claim 3 wherein the output indication also includes an indication of the size of the item detected.

6. A method according to claim 3, wherein the output indication also includes an alarm indication produced when the rate of item detection, the size of a single item, or the amount of material represented by the items detected over a given interval of time exceeds a threshold value, or when a progressive increase in any of these values occurs, either for all items detected or for items of a particular metal.

7. A method according to claim 2 wherein the output indication includes a display of a point allocated to an item on a graph of the value of the amplitude change produced by the item plotted against the value of the frequency change which it produces, the display having marked on it areas corresponding to different metals.

8. A method according to claim 1 including deriving reference values of the frequency and amplitude and correcting the values of the frequency changes and the amplitude change to take into account any variation in the reference values.

9. Apparatus for identifying the metal of which a metal item moving along a predetermined path is made including an oscillator having a resonant circuit including a capacitor and an inductor, the oscillator being such that the frequency of its oscillation is dependent on the inductance of the inductor and the amplitude of its oscillation is dependent on the resistive loading on the inductor, and the inductor being magnetically coupled to the predetermined path, first means for measuring the change in the frequency of the oscillation produced by the oscillator due to the magnetic coupling of the item to the inductor and producing an output representing that change in frequency, second means for measuring changes in the amplitude of the oscillation produced by the oscillator due to the magnetic coupling of the item to the inductor and producing an output representing that change in amplitude, and output means responsive to the output of the first means and the output of the second means to produce an output indication characteristic of the metal of which the item moving along the predetermined path is composed.

10. Apparatus according to claim 9 in which the inductor is a coil and the predetermined path passes through the coil so the both the change in frequency and the change in amplitude of the oscillation produced by the presence of the metal item exhibit peaks as the magnetic coupling of a metal item to the inductor reaches a maximum, the output means being responsive to the peak values of both the change in frequency and the change in amplitude.

11. Apparatus according to claim 9 in which the predetermined path includes an abrupt change of direction so that any metal item following the predetermine path is brought substantially to rest for a short period of time whilst the magnetic coupling of the item to the inductor is close to maximum value and the values of both the change in frequency and the change in amplitude at some instant during that short period of time are applied to the output means.

12. Apparatus according to claim 9 in which the output means includes means for producing digital representations of the values of the change in frequency and the change in amplitude applied to it and digital computing means programmed to generate an output indication identifying the metal of the item in response to the representation.

13. Apparatus according to claim 12 wherein the output indication includes the name of the metal detected in the item.

14. Apparatus according to claim 9 or 13 wherein the output indication also includes an indication of the size of the item detected.

15. Apparatus according to claim 9 further including means for producing an alarm indication in response to one or more of the following criteria for all metals or for a specific metal:

(a) when the number of items detected in a particular interval exceeds a given value
(b) when an item larger than a particular size is detected
(c) when the total amount of material in detected items accumulated over a particular time interval is larger than a given value
(d) when the rate of detection of items or the rate of accumulation of material in detected items increases progressively over a given interval of time.

16. Apparatus according to claim 12 wherein the computing means includes non-volatile storage means and is arranged to accumulate in it data relating to metal items detected over a long period of time to and produce outputs from an analysis that data.

17. Apparatus according to claim 12 wherein the output indication includes a display of a point allocated to an item on a graph of the value of the amplitude change produced by the item plotted against the value of the frequency change which it produces, the display having marked on it areas corresponding to different metals.

18. Apparatus according to claim 17 wherein the display includes a plurality of interchangeable transparent overlays on which the areas corresponding to different metals are marked for different groups of metals.

19. Apparatus according to claim 12 wherein the digital computing means includes interchangeable read-only memories storing data relating to different groups of metals for enabling the digital computing means to distinguish between the metals of a selected group by the changes in the amplitude and frequency of the oscillation, whereby a particular read-only memory can be selected and connected to the digital computing means to suit the metals likely to occur in a particular application of the apparatus.

20. Apparatus according to claim 9 in which the oscillator is a marginal oscillator.

21. Apparatus according to claim 9 in which the resonant circuit has the inductor and the capacitor connected in parallel and the oscillator includes an amplifier having a high input impedance with its input connected to the resonant circuit and a high impedance output circuit connected to provide positive feedback to the resonant circuit, the amplifier being arranged so that the amplitude of the oscillation produced by the oscillator is dependent on the resistance of the resonant circuit at resonance.

22. Apparatus according to claim 9 including a second oscillator of the same construction as the first-mentioned oscillator but connected to a reference coil not magnetically coupled to the metal items, and means for subtracting representations of variations in the frequency and amplitude of the oscillation produced by the second oscillator respectively from representations of the frequency and amplitude of the oscillation produced by the first-mentioned oscillator before measuring the changes in the latter representations.

23. Apparatus according to claim 9 including a reference coil not magnetically coupled to the metal items, means for periodically connecting the reference coil to the oscillator in place of the inductor, and means for correcting the frequency and amplitude changes in the oscillation produced by the oscillator when connected to the inductor in response to variations in the frequency and amplitude of the oscillation produced by the oscillator when connected to the reference coil.

* * * * *